O. G. RIESKE.
MILKING APPARATUS.
APPLICATION FILED OCT. 26, 1912.

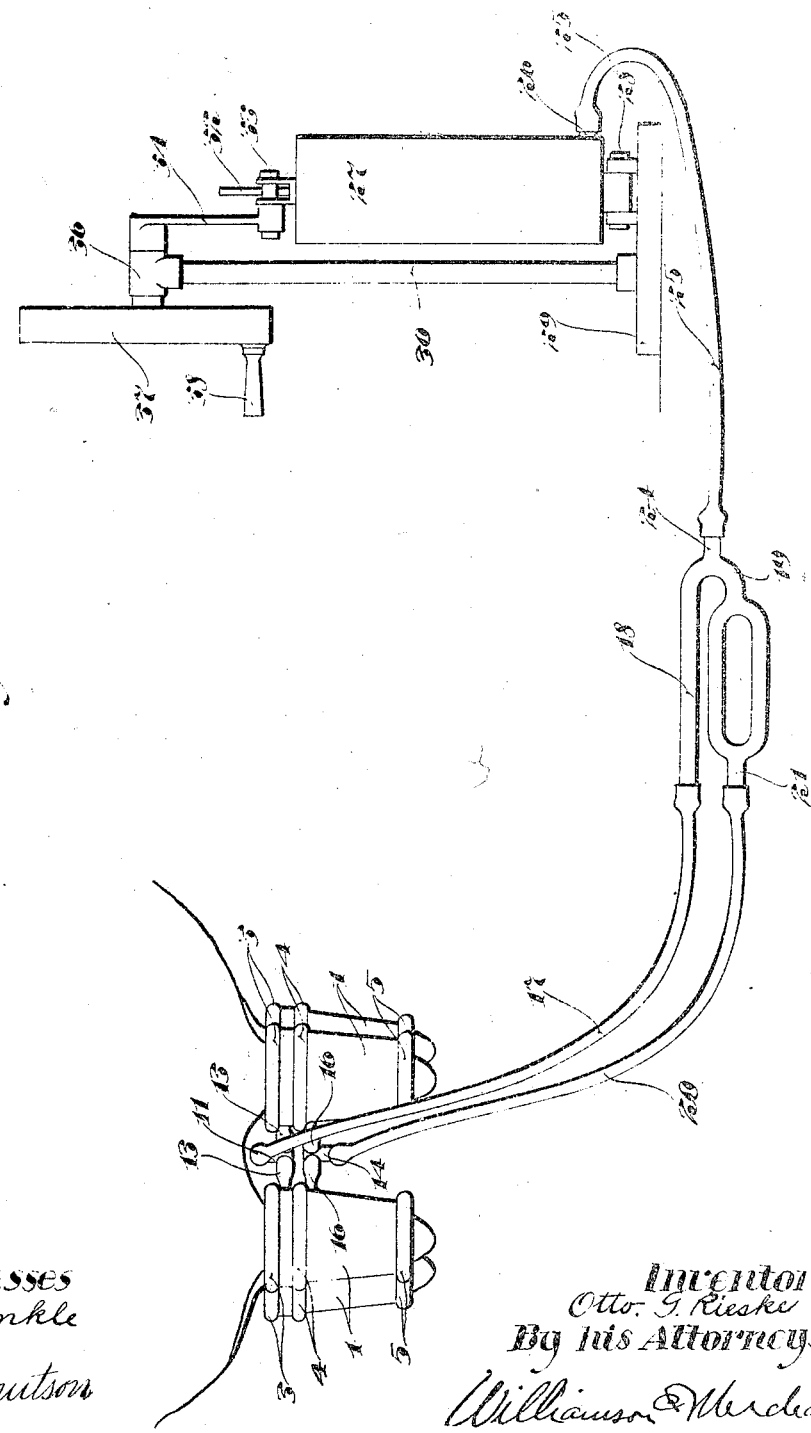

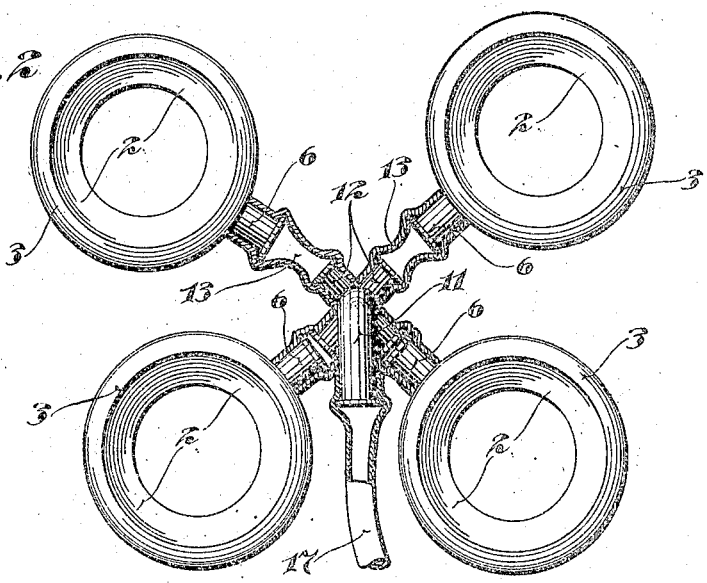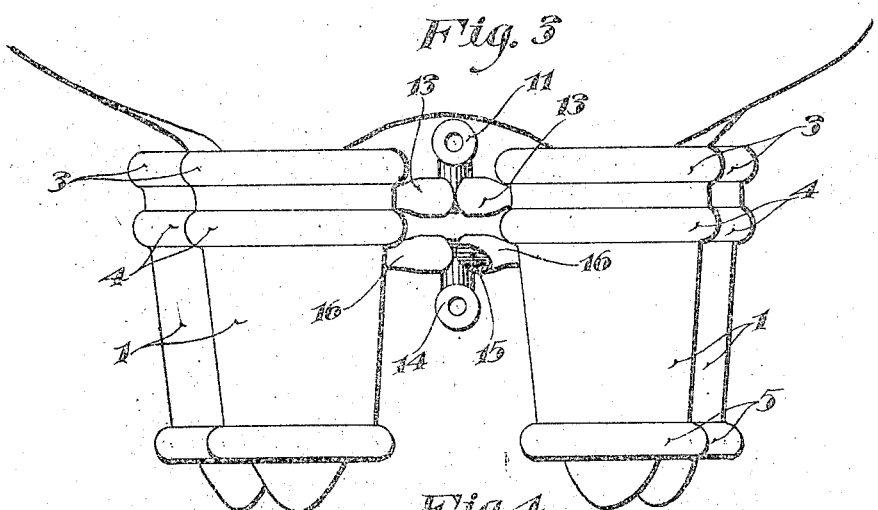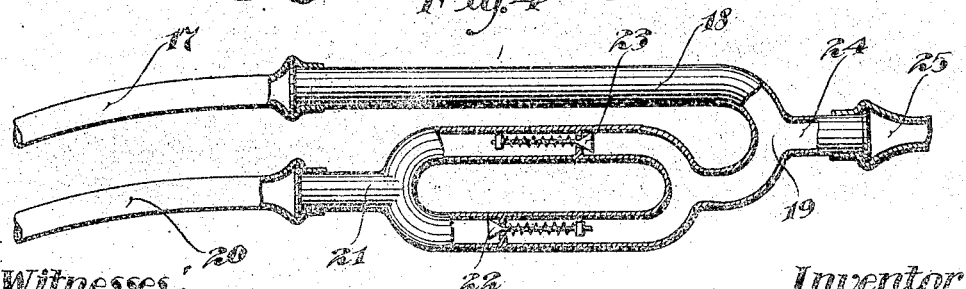

1,106,846.

Patented Aug. 11, 1914.
4 SHEETS—SHEET 3.

Witnesses:
E. C. Skinkle
Geo. Knutson

Inventor:
Otto G. Rieske
By his Attorneys
William Merchant

O. G. RIESKE.
MILKING APPARATUS.
APPLICATION FILED OCT. 26, 1912.

1,106,846.

Patented Aug. 11, 1914.
4 SHEETS—SHEET 4.

Witnesses:
E. C. Skinkle
Geo. Knutson

Inventor:
Otto G. Rieske
By his Attorneys,
Williamson Merchant

UNITED STATES PATENT OFFICE.

OTTO G. RIESKE, OF BEAVER DAM, WISCONSIN, ASSIGNOR TO ALBERT J. EUCHENHOFNER, OF INDIANAPOLIS, INDIANA.

MILKING APPARATUS.

1,106,846.   Specification of Letters Patent.   Patented Aug. 11, 1914.

Application filed October 26, 1912. Serial No. 727,922.

*To all whom it may concern:*

Be it known that I, OTTO G. RIESKE, a citizen of the United States, residing at Beaver Dam, in the county of Dodge and State of Wisconsin, have invented certain new and useful Improvements in Milking Apparatus; and I do hereby declare the following to be a full, clear, and exact description of the invention, such as will enable others skilled in the art to which it appertains to make and use the same.

My invention has for its object to provide an improved milking apparatus, and to such ends, the invention consists of the novel devices and combinations of devices hereinafter described and defined in the claims.

In the present invention, as a feature which I believe to be broadly new in milking apparatus, I utilize a liquid, such as water, instead of an elastic fluid, such as air, as the medium for transmitting the pressure impulses to the expansible elements of the teat cups. Otherwise stated, this improved milking apparatus is operated on the hydraulic principle instead of on the usual pneumatic plan. By this improved method or process, the impulses are made more positive and the resulting action is more certain.

The invention also provides a teat cup which is novel, *per se*, and which is capable of being used either with a non-elastic liquid, as the actuating means, or with an elastic fluid, such as air.

The invention further includes a novel arrangement of a cylinder and coöperating piston for producing the impulses, and in which the piston has a yielding action, whenever a predetermined pressure on the liquid is exceeded.

In the accompanying drawings which illustrate the invention, like characters indicate like parts throughout the several views.

Figure 7:
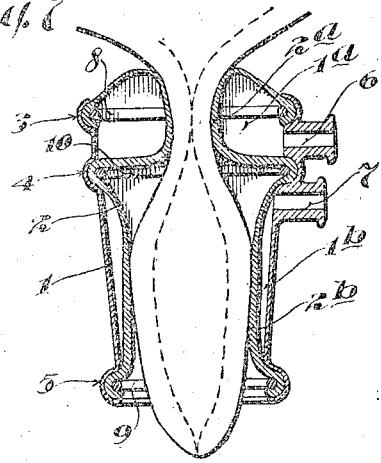
Figure 8:
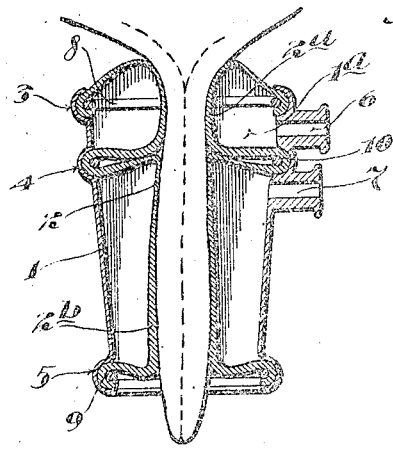
Figures 9, 10:
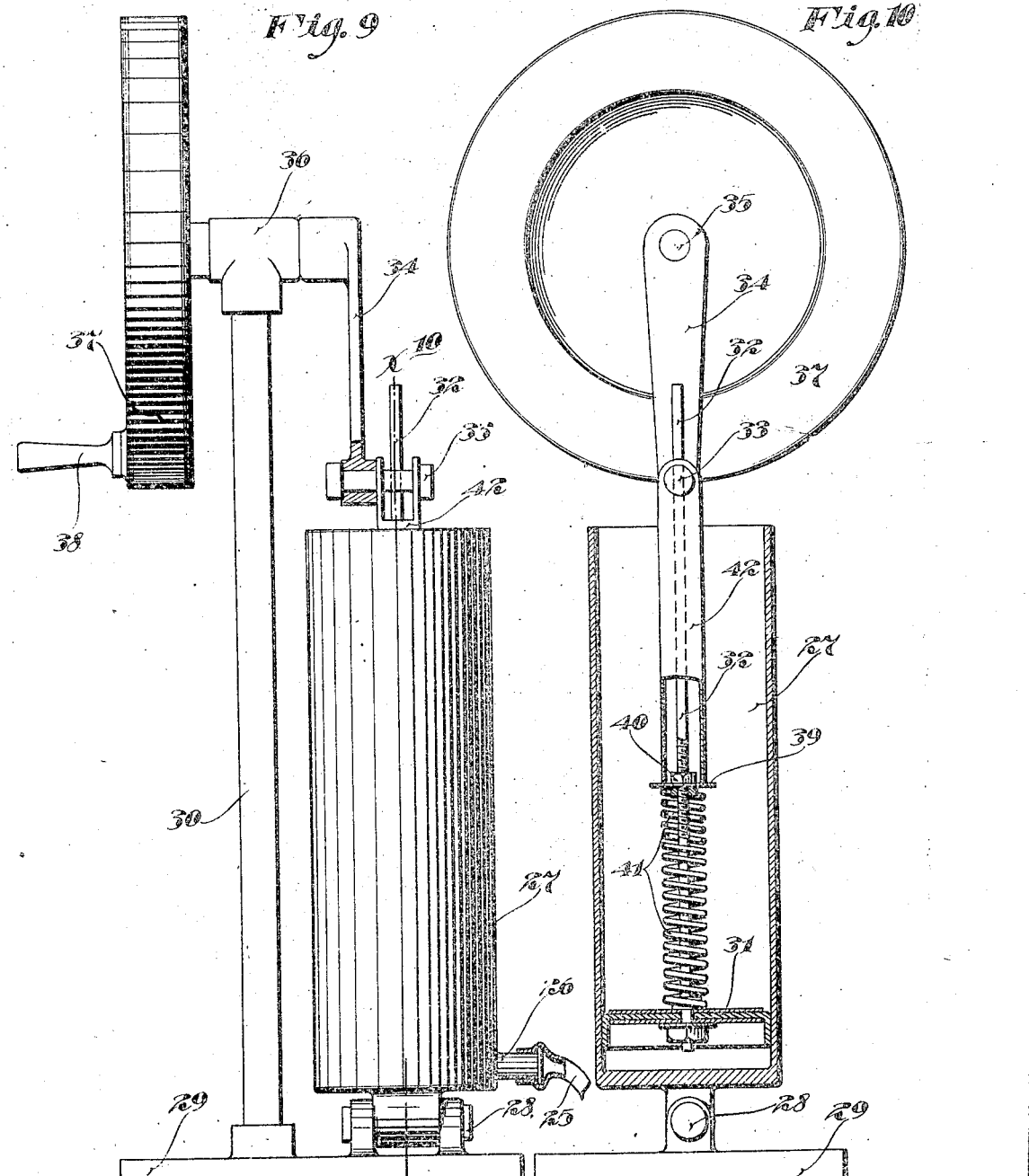

Referring to the drawings, Figure 1 is a diagrammatic view showing the complete apparatus; Fig. 2 is a plan view with some parts sectioned, showing a group of four connected teat cups; Fig. 3 is a side elevation of the parts shown in Fig. 2; Fig. 4 is a plan view with some parts sectioned, showing a valve-equipped tube constituting a part of the connection between the pulsator and the teat cups; Figs. 5, 6, 7 and 8 are sectional views through one of the teat cups, illustrating the several different actions thereof; Fig. 9 is a side elevation of the so-called pulsator afforded by the cylinder and piston of novel arrangement; and Fig. 10 is a vertical section taken on the line $x^{10}$ $x^{10}$ on Fig. 9.

Attention is first called to the construction of the improved teat cup.

Each teat cup has a thin metal casing or shell 1 and a very flexible rubber inner tube 2. The shell 1 is formed with three internal, outwardly pressed, annular channels 3, 4 and 5. Between the channels 3 and 4, said shell 1 is provided with a radially projecting nipple 6 and between the channels 4 and 5, with a similar nipple 7. The rubber tube 2, at its upper end, is tightly seated with an air tight joint, within the upper channel 3, by a stiff retaining ring 8, and, at its lower end, it is, by a similar ring 9, likewise seated in the lower channel 5. A short distance below its upper end, the said rubber tube 2 is also seated, with an air tight joint, in the intermediate channel 4, by a third retaining ring 10. In this way, the rubber tube 2 is divided into independently acting upper and lower portions $2^a$ and $2^b$, respectively, and the space between the said two tubes and the shell 1, is divided into upper and lower chambers $1^a$ and $1^b$, respectively, that are in communication, respectively, with the nipples 6 and 7. Those portions of the rubber tube 2 that are engaged by the retaining rings 8, 9 and 10, are of greater thickness than the main body portion of the said tube. Preferably, the walls of the said tube 2 decrease in thickness in a direction from the lower ring 9 toward the intermediate ring 10, and again decrease in thickness in a direction from the intermediate ring 10 toward the upper ring 8. This is done for a purpose.

The four teat cups are assembled around the delivery end of a short coupling tube 11 which is provided with four radially projecting nipples 12. Each nipple 12 is connected by a short rubber tube 13 to the upper nipple 6 of one of the teat cups.

The numeral 14 indicates a lower coupling tube which, like the tube 11, has four radially projecting nipples 15 connected by short rubber tubes 16 to the lower nipples 7 of the respective teat cups.

The upper coupling tube 11 is connected by a rubber tube 17 to one branch 18 of a so-called pulsation distributer, indicated as an entirety by the numeral 19. The coupling tube 14, in a similar manner, is connected by a rubber tube 20 to another tube 21 of the so-called pulsation distributer. The tube 21 is bifurcated or divided and, in one branch, has a spring closed check valve 22 and, in its other branch, a spring closed check valve 23. The check valve 22 permits a flow of water or other medium into and through the tube 20, but checks a reverse flow. The check valve 23 operates just in a reverse manner. The said check valve 23, we will assume, requires a pressure of about three pounds per square inch to open it, but the check valve 22 is set to open under the slightest pressure which will serve to normally hold it closed. The said pulsation distributer has a nipple or tube 24 connected, by a long rubber tube or hose 25, to a nipple 26, that opens into the lower end of a cylinder 27. This cylinder 27, as shown, is connected at its lower end, by a pivot 28, to a base 29 having an upwardly projecting pedestal 30.

Working within the cylinder 27 is a piston 31. The piston 31 is provided with a long stem 32 that works diametrically through a wrist pin 33 journaled to a crank arm 34 carried by a short shaft 35 journaled in a bearing 36 on the upper end of the pedestal 30.

The numeral 37 indicates what may be assumed to be either a pulley or a fly wheel and which may be driven by a belt or which may be driven by hand power applied to a crank 38, carried by the said wheel 37.

The numeral 39 indicates a washer which is adjustably held against a nut 40 on the intermediate portion of the piston rod 32. A coiled spring 41 surrounds the rod 32 and is compressed between the washer 39 and piston 31. Obviously, the tension of the spring 41 may be varied by adjustments of the nut 40.

The numeral 42 indicates a sleeve which surrounds the upper portion of the piston rod 32, bears against the washer 39, and is connected on the wrist pin 33.

Figure 5:
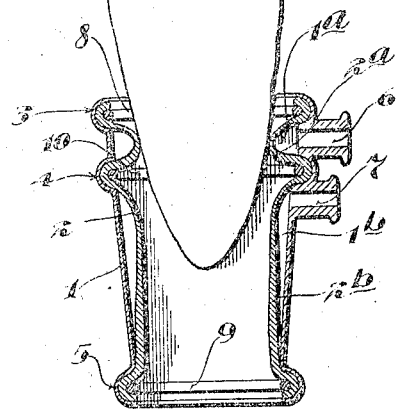
Figure 6:
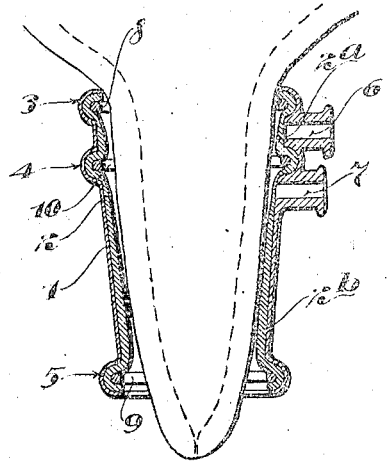

Operation: The operation of the improved milking apparatus, above described, is substantially as follows: When the piston 31 of the pulsator is given a suction or upward stroke, a back pressure will be produced in the teat cups and both the upper and lower portions of the flexible tube will be expanded or drawn against the casing 1, so that the several teat cups may be easily applied to the cow's teats, which latter are indicated in the drawings by the character Z (see Fig. 6). Fig. 5 shows approximately the normal shape of the flexible tube 2 after it has been applied in the casing but when not subject to pressure in either direction. Before it is applied, the said flexible tube may have an approximately cylindrical shape. Obviously, the flexible tubes 13 permit relative movements of the several teat cups, so that they may be easily adjusted to the cow's teats. The pressure pulsations are produced by a downward or working stroke of the piston 31, which, of course, produces a pressure on the liquid used as a medium in transmitting the pressure and pulsations to the teat cups. The spring 41 may be adjusted for different pressures, which, for the purposes of this case, may be assumed to be eight pounds to the square inch. Here it should be remembered that the check valve 22 is so set that it will remain closed until a pressure of approximately three pounds has been exceeded. Hence, it results that the pressure produced by the working stroke of the piston 31 will immediately produce a pressure in the upper chambers 1ª of the teat cups, and the important effect of this is that the upper portion 2ª of the flexible tube will be contracted against the base of the teat, thereby choking the same, as shown in Fig. 7, so that the milk contained in the teat cannot flow backward or upward into the udder. Instantly following this choking of the teat, the increasing pressure will open the valve 22 and thereby admit liquid into the lower chamber 1ᵇ, so that the lower main section 2ᵇ of the flexible tube will be contracted against the main body of the teat and squeeze the same, as shown in Fig. 8, thereby causing the milk to be ejected from the teat. Owing to the varying thickness of the walls of the flexible tube 2, pressure applied in the chambers 1ª and 1ᵇ will first contract the most sensitive portions of said tube, which, as shown, is the uppermost in each of said sections, and then gradually work downward on the same. Immediately upon the suction or upward movement of the piston 31 of the pulsator, the water, or other liquid or medium contained in the tubes of the milking system, will be drawn backward and both sections 2ª and 2ᵇ will be caused to expand radially outward against or toward the surrounding casing 1, so as to thereby give the milk a chance to again fill the expanded teat. These pressure pulsations will, of course, be repeated over and over, with a properly timed action. All of the several teat cups are simultaneously applied, and the distribution of the pressure against the two sections or portions of the flexible tube, are controlled by the single valve mechanism shown in Fig. 4. In fact, any desired number of sets of teat cups may be controlled by the said single valve mechanism.

The milking action above described, very closely imitates the action produced on the teat in milking by hand. The milking action is due entirely to pressure applied in the proper manner to the teat, and suction is not relied upon or utilized as a means for drawing or pulling the milk from the teats. Hence, a continuation of the milking action on the teat or on the teats after the cow has been milked dry, will do no harm, and cannot cause bleeding of the teats, as is done in apparatus wherein suction is relied upon to draw the milk from the teats.

The greater the number of cups in action, the greater will be the operative movement of the piston 31 of the pulsator required to produce the proper pulsations. Hence, the arrangement should be such that the extreme movements of the said piston will be sufficient for the maximum number of teat cups employed. When a less number of teat cups are in action, the piston will move until it will produce the proper pressure, determined by the tension of the spring 41, and then the said spring will yield and permit the crank arm 34 to continue its rotations without imparting full movements to the said piston.

What I claim is:

1. In a milking apparatus, the combination with a teat cup having elastic upper and lower sections, of a pulsator, independent connections between said pulsator and the two elastic elements of said teat cup, and reversely acting yieldingly seated check valves in branches of the connection to one of said elastic sections, operative to cause contractions of the elastic sections upon the nipple, at different times.

2. In a milking apparatus, the combination with a teat cup having elastic upper and lower sections, of a pulsator, independent connections between said pulsator and the two elastic elements of said teat cup and reversely acting yieldingly seated check valves in branches of the connection to one of said elastic sections, operative to cause contractions of the elastic sections upon the nipple at different times, the contraction of the upper elastic section being in advance of the contraction of the lower elastic section, substantially as described.

3. In a milking apparatus, the combination with a plurality of teat cups having elastic inner members, of a pulsator comprising a cylinder and a piston, conduits connecting said cylinder and the several teat cups, and means for reciprocating one of the elements of said pulsator, said means including a yielding element arranged to produce a predetermined maximum compression regardless of the number of teat cups which may be in action.

4. A teat cup comprising a rigid metallic outer casing having internal channels at its ends and intermediate portion, and a rubber tube within said casing, and retaining rings pressing the upper end and intermediate portion of said rubber tube into the internal channels of said casing, thereby forming upper and lower chambers between said casing and rubber tube, and the said casing having ports opening into the said upper and lower chambers.

5. A teat cup comprising an outer casing and an elastic inner tube, the said elastic inner tube having air tight connections to the upper and lower ends and intermediate portion of said casing, and the said casing having ports opening into the upper and lower chambers thus formed between said casing and said tube, the rubber tube having walls that decrease in thickness from its lower end toward its intermediate portion, and which also decrease in thickness in a direction from its intermediate toward its upper end portion, substantially as described.

In testimony whereof I affix my signature in presence of two witnesses.

OTTO G. RIESKE.

Witnesses:
HARRY D. KILGORE,
F. D. MERCHANT.